United States Patent [19]
Ellis

[11] 3,841,211
[45] Oct. 15, 1974

[54] PIT BARBECUE APPARATUS

[76] Inventor: Clarence Eugene Ellis, 724 Monument Rd., Ponca City, Okla. 74601

[22] Filed: Oct. 16, 1973

[21] Appl. No.: 406,960

[52] U.S. Cl.................. 99/482, 126/25 R, 236/101
[51] Int. Cl............................................. A23b 1/04
[58] Field of Search....... 126/59.5, 25 R, 25 A, 9 R; 99/467, 468, 482; 338/316; 236/101 R

[56] References Cited
UNITED STATES PATENTS

| | | | |
|---|---|---|---|
| 2,626,561 | 1/1953 | Fortune | 99/482 X |
| 2,789,877 | 4/1957 | Pfundy | 220/41 X |
| 3,173,357 | 3/1965 | Nunnery | 99/468 X |
| 3,327,616 | 6/1967 | Ozymy | 126/25 A |
| 3,644,124 | 2/1972 | Bedsole | 99/482 X |
| 3,776,127 | 12/1973 | Muse | 99/482 |

*Primary Examiner*—William F. O'Dea
*Assistant Examiner*—Harold Joyce
*Attorney, Agent, or Firm*—Lawrence L. Colbert

[57] ABSTRACT

A pit barbecue apparatus embodies a fuel supporting tray or pan beneath which is positioned an electrical heating element. At an upper level of the pit enclosure, a food support grill is located, above which is a chimney. Heat from the heating element causes the wood fuel to smoke and smolder but not to blaze. The elevation of the fuel tray is self-regulating through bi-metal support elements.

2 Claims, 3 Drawing Figures

PATENTED OCT 15 1974 3,841,211

PIT BARBECUE APPARATUS

BACKGROUND OF THE INVENTION

Pit barbecue cooking is well known in the prior art but has never been competitive with more conventional cooking methods mainly because of inconvenience in providing a satisfactory apparatus and maintaining the same. In the crudest form, a pit can be dug in the ground and a fire kindled on a suitable grate down in the pit, with another grate near ground level supporting food, such as meat. Such a cooking method is highly desirable in terms of producing tasty food but for obvious reasons the above crude arrangement cannot be widely utilized and certainly not on a commercial scale.

The prior patented art exemplified by U.S. Pat. 3,699,876, issued Oct. 24, 1972, for COMBINATION CHARCOAL GRILL AND PIT BARBECUE COOKER, shows a simple unit involving a housing in the lower part of which a grate for charcoal or wood is positioned and above which grate a meat grill is located in the housing. When the wood is ignited on the lower grate, burning takes place with a full flame and a draft up through a chimney in the top of the housing supports this flame while cooking the meat or other food. It is impractical in many situations to utilize burning wood with an open flame and for this and other reasons the patented device has been limited in its usage. Accordingly, the objective of this invention is to improve upon the prior art in general and the above-noted patented device in particular by providing a pit barbecue apparatus which is practical in construction and operation, easy to maintain and operate, and which avoids the mentioned practical disadvantages of the prior art while simultaneously providing an improved form of cooking. More particularly, the present invention avoids the use of a fixed lower grate and avoids the creation of an open flame due to burning of wood on such grate. Instead, the invention utilizes a pan-like support or tray for wood arranged above an electrical heating element, together with an overhead meat grill, all contained within a suitable housing. The heat generated by the element is sufficient to cause smoldering and profuse smoking of the wood fuel, without igniting the same in an open flame. The heat generated by the element plus the heat from the smoking wood produces relatively fast cooking, with all of the flavor advantages of the traditional barbecue pit. To facilitate cleaning, the fuel tray may be removed through a suitable access door on the housing. The heating element may be of the calrod type. Smoke density control may be obtained by mounting the fuel tray on bimetallic support elements which expand or contract to raise and lower the tray relative to the fixed electrical heating element. The amount of heat is thermostatically controlled by regulating current to the calrod element the same as in a conventional electric oven. The entire device is characterized by simplicity, economy of construction and efficiency of operation.

BRIEF DESCRIPTION OF DRAWING FIGURES

DETAILED DESCRIPTION

Figures 1, 2, 3:
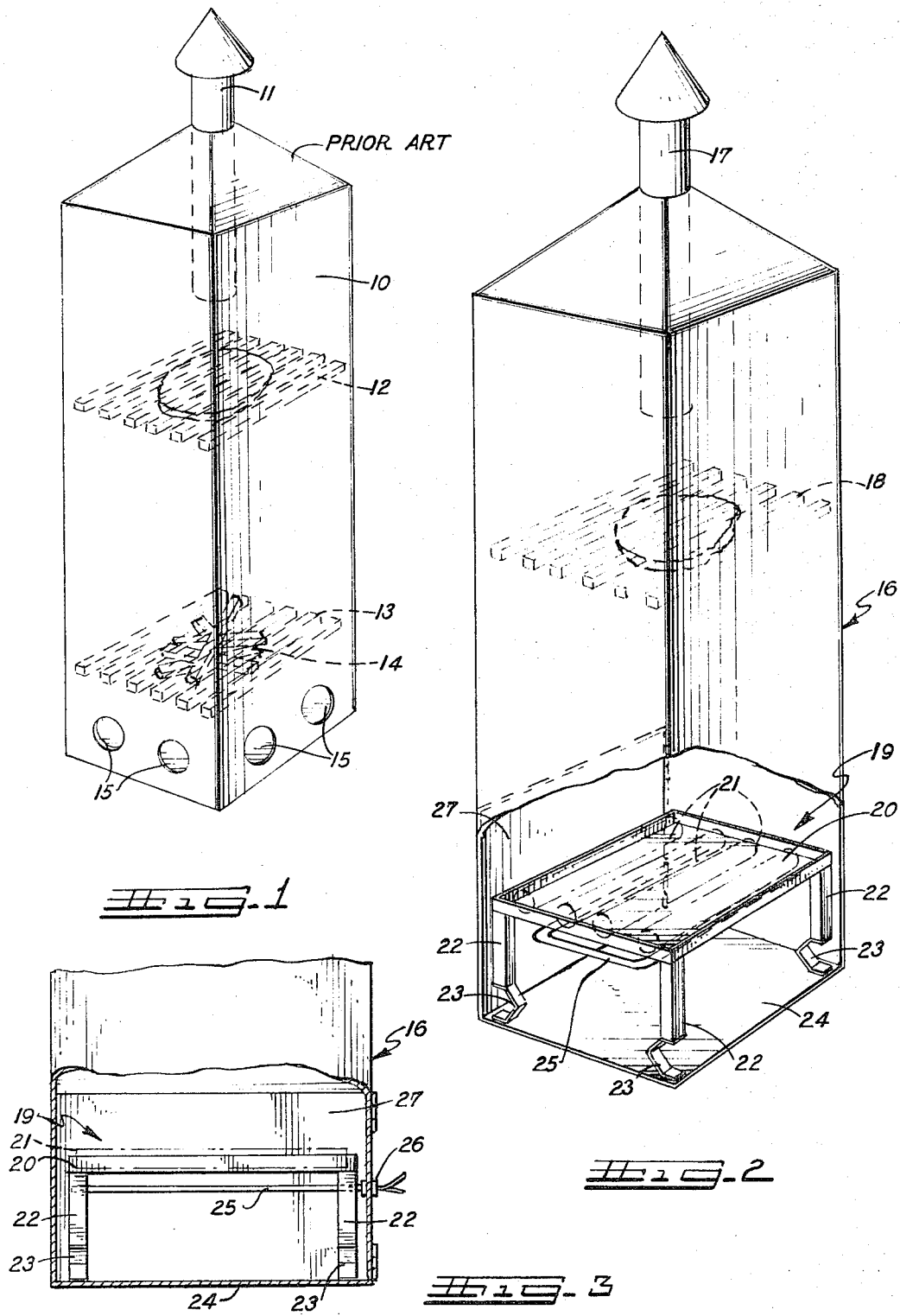
FIG. 1 is a perspective view of a pit barbecue apparatus in accordance with the prior art.
FIG. 2 is a similar view of a pit barbecue apparatus embodying the invention.
FIG. 3 is a fragmentary side elevation of the apparatus with the housing in cross section.

Referring to the drawing in detail, wherein like numerals designate like parts, reference is made to the prior art in FIG. 1 wherein a pit barbecue apparatus or cooker comprises a housing 10 of preferred cross sectional shape having a chimney 11 at its top above a meat or food grill 12 at a fixed or adjustable elevation in the housing. Well below the meat grill 12 and near the bottom of the housing, a fixed grate 13 is mounted for the support of wood fuel 14 thereon, suitable draft openings 15 being provided if desired below the grate 13 in the housing side walls. This prior art arrangement, while workable and resulting in tasty food, has the practical disadvantages already enumerated including notably the disadvantages incident to utilizing an open blaze and problems of cleaning out the ash pit below the grate 13.

Referring now to FIGS. 2 and 3 illustrating the invention, the pit barbecue apparatus embodies a housing 16 having a smoke chimney 17 and a meat grill 18 substantially as described in connection with the prior art. The grill 18 may be supported adjustably by conventional oven-type brackets, not shown, so that its height may be varied.

Within the bottom portion of the housing 16 is removably mounted a fuel pan or tray assembly 19 which is rectangular in the illustrated embodiment. For example, the tray body may be approximately 14 inches square and three-fourths inch deep, being formed of imperforate sheet metal and being open at the top. The tray body 20 is adapted to support suitable wood fuel 21, such as small logs or kindling sticks, and is supported by corner legs 22 within the housing 16.

The bottoms of the legs 22 are equipped with bimetal feet 23 which rest on the floor 24 of the housing. When heated beyond a certain degree, these feet will expand and cause elevation of the fuel tray 20 relative to a fixed underlying electrical heating element 25, such as a calrod element. The fixed element 25 is supported by a conventional socketing means 26 on one side wall of the housing 16, FIG. 3. Conversely, when the elements 23 are cooled, they will contract and lower the fuel tray in relation to the heating element to thereby automatically regulate the burning of the wood fuel and increase or decrease the emission of smoke therefrom without ever having the fuel burst into an open flame and to merely continue smoking and smoldering during the cooking process.

As shown in the drawings, the electrical heating element 25 is in the form of a U-shaped loop which spans the housing 16 horizontally at a fixed elevation near and above the bottom thereof in relatively close proximity to the bottom of the tray 20. Conventional thermostat controls for the element 25, not shown, including an on and off switch are provided. However, while the element 25 is energized and heating, the automatic expanding and contracting of the feet 23 will tend to maintain the wood fuel 21 at an even temperature, smoldering and smoking without bursting into an open flame. When the feet expand due to heating and raise the tray 20 above the fixed element 25, the tray will become cooler and the degree of smoldering and smoke emission will be reduced. The reduction in burning of the wood fuel and therefore the reduction in total confined heat due to elevating the tray 20 will eventually influence the elements 23 sufficiently to cause them to contract and lower the tray in relation to the element 25 which in turn will increase the smoldering and smoking and therefore the heat. This self-regulating operation is continuous and automatic and is additional to any conventional electrical controls with which the element 25 may be equipped.

The smoking and smoldering of the wood fuel together with the heat from the element 25 will cook the meat or other food on the grill rack 18 with all of the flavor and attributes present with traditional pit barbecues and without the inconvenience factors. It is again emphasized that with the invention the cooking process is flameless and the wood fuel burns slowly with a smoldering action and profuse smoking. The apparatus is essentially draftless but has a chimney as shown to release smoke after it passes through the grill 18 and flows over the food. Sufficient air to support combustion can enter the housing 16 through the chimney and through other small cracks and openings therein. A door to allow removal of the entire tray unit 19 from the housing is provided in one housing side wall as indicated by the number 27.

While the heating element 25 is shown as an electrical element, it should be understood that a gas burner or liquid fuel burner with suitable controls could be used beneath the fuel tray 20, if preferred.

It is to be understood that the form of the invention herewith shown and described is to be taken as a preferred example of the same and that various changes in the shape, size and arrangement of parts may be resorted to, without departing from the spirit of the invention or scope of the subjoined claims.

I claim:

1. A cooking apparatus comprising a housing having a chimney means, a food supporting grill rack positioned within the housing at an upper level therein, a fuel tray unit adapted to support wood fuel positioned at a lower level in the housing beneath said grill rack, a heating element within the housing in the lowermost region thereof and positioned below the fuel tray unit, said fuel tray unit comprising a shallow imperforate sheet metal tray body having support legs, and bimetal support springs connected with said legs and being influenced by heat changes in said housing to cause automatic raising and lowering of the tray body relative to the heating element.

2. The structure of claim 1, and said heating element comprising a horizontal electrical element disposed at a fixed elevation in the housing below said tray body.

* * * * *